United States Patent [19]
Calves et al.

[11] 3,838,426
[45] Sept. 24, 1974

[54] ELECTRONIC AMBIGUITY-REMOVAL DEVICE FOR PHASE MEASUREMENT RADIONAVIGATION SYSTEMS, MORE PARTICULARLY FOR THE OMEGA SYSTEM

[75] Inventors: Jean Calves, Nantes; Rene Gounon, Mauves/Loire, both of France

[73] Assignee: Societe D'Etude, Recherches Et Constructions Electroniques Sercel, Carguefou, France

[22] Filed: Jan. 30, 1973

[21] Appl. No.: 327,975

[30] Foreign Application Priority Data
Mar. 23, 1972 France .............................. 72.10168

[52] U.S. Cl. .......................................... 343/105 R
[51] Int. Cl. ............................................ G01s 1/30
[58] Field of Search ............ 343/105, 112 D, 105 H, 343/105 LS

[56] References Cited
UNITED STATES PATENTS
3,665,469  5/1972  Williams .......................... 343/105 R
3,696,424  10/1972  Pierce ............................. 343/105 R Primary Examiner—Maynard R. Wilbur
Assistant Examiner—Richard E. Berger
Attorney, Agent, or Firm—Brietenfeld & Levine

[57] ABSTRACT

An OMEGA phase-measurement radionavigation system includes an ambiguity-removal device, in which a correction signal for correcting velocity differences at different frequencies is added to a differential phase signal representing the phase factor of a sub-multiple of the basic frequency. Each corrected signal thus obtained has subtracted from it a compensation signal equal to the whole-number differential channel immediately below it, and the resultant of the subtraction visually displayed on an indicator.

9 Claims, 4 Drawing Figures

ELECTRONIC AMBIGUITY-REMOVAL DEVICE FOR PHASE MEASUREMENT RADIONAVIGATION SYSTEMS, MORE PARTICULARLY FOR THE OMEGA SYSTEM

BACKGROUND OF THE INVENTION

The present invention concerns generally radio-navigation systems using phase measurement.

It is known that phase measurement radionavigation systems generally have an ambiguity, resulting from the fact that phase measurements are necessarily made with respect to the nearest whole number of phase rotations. In the following description it will be assumed that each phase thus measured provides position-line information. This applies to all radio-navigation systems, although the method of phase measurement differs with the type of radionavigation system used.

A phase measurement therefore supplies position-line information within a channel of position lines, the width of each channel corresponding to a phase variation equal to one phase rotation. The difficulty attaching to the ambiguity resides in the fact that the number of such channels is most often very high, and the user does not always know which is the channel corresponding to each phase measurement made.

Channel identification, also called ambiguity removal, is therefore an important problem in phase measurement radio-navigation.

To facilitate ambiguity removal, it is known to cause a number of waves having different frequencies to travel over the same propagation trajectory and to cause these waves to beat with each other to obtain ambiguity-removal frequencies (which are fictitious, that is to say they do not correspond to an actual wave propagated on the said trajectory), the values of these ambiguity-removal frequencies being distinctly less than those of the actual waves travelling over the said trajectory. Phase measurements made on the beat signals, and therefore associated with the ambiguity-removal frequencies, consequently supply distinctly wider channels than those corresponding to the phase measurements made on the waves themselves.

In order that the limits of these more extensive channels will coincide with those of the basic channels, the values of the frequencies of the waves are so selected that the differences obtained by beating are whole sub-multiples of the frequencies defining the basic channels, and these waves are consequently maintained in fixed phase relations.

Assuming, according to the theoretical principles of radionavigation, that the speeds of propagation of the waves are constant and independent of their frequency, ambiguity removal therefore consists in using the phase information obtained with the ambiguity-removal frequencies for determining in a sure manner weighting figures less than the number of phase rotations in the basic network, which is also called the fundamental channel number.

The fractional part of the fundamental channel number is supplied by a phase measurement made at a frequency of the basic network or fundamental frequency. The most significant figures are obtained by estimation, in the manner known per se.

In reality, in the case of waves transmitted in the vicinity of the earth's surface, the propagation conditions are complicated, because the terrestrial atmosphere comprises the ionosphere which reflects electromagnetic radiation. The influence of the reflecting layers of the ionosphere and of the ground (including water surfaces) is greater, the more extensive is the region covered by the radionavigation system. Considerations of relative precision, which the person versed in the art will readily understand, lead to the selection of frequencies which are lower, the more extensive is the said region, for a fixed number of transmitting stations.

Waves of very low frequency (of the order of 10 kHz), however, are propagated on the earth's surface substantially as in a wave guide whose walls are formed on the one hand by the ionosphere and on the other by the surface of the globe.

Beyond a certain region, the apparent speed of propagation of the waves is therefore not the speed of propagation in vacuo but a phase velocity which is a function of the frequency. The times of travel of the waves, therefore, also vary as a function of the respective frequencies of these waves, and it follows that the correspondence between the phases of the waves at reception is not the same as at transmission.

Consequently, the phases measured at reception have in this case to be subjected to corrections permitting the real phenomena to be reduced to the basic principle according to which the times of travel of waves of different frequencies from transmission to reception are supposed to be equal.

The present invention is applicable to phase measurement radionavigation systems, in which the values of the propagation frequencies and/or the extent of the geographical region of the radionavigation are such that the phase information obtained from the ambiguity-removal frequencies has to be subjected to correction. It applies more particularly, but not exclusively, to the OMEGA radionavigation system.

In the case of the OMEGA system, tables prepared by the "United States Navel Oceanographic Office" supply the corrections to be made as a function of the place and time (particularly day and night). Up to the present, the application of these corrections is done more often by hand, resulting in a complicated procedure for the user who not only has to carry out the corrections but also the ambiguity removal.

A channel identification device substantially simplifying the ambiguity-removal operations has been proposed.

This proposed device necessitates the intervention of the operator on each determination of position with ambiguity removal. This is a major disadvantage, all the more so since it is desirable to know continuously the movements of the moving object carrying a receiver, in order better to detect the channel changes.

SUMMARY OF THE INVENTION

According to the invention there is provided an electronic ambiguity-removal device for use in a phase-measurement radionavigation receiver supplying a differential phase signal intended, after correction, for ambiguity removal, comprising a correction computing circuit for supplying a signal for the correction of the differential phase signal, an addition circuit for the algebraic addition of the differential phase signal and the correction signal for supplying a corrected differential phase signal, a comparator circuit connected to the addition circuit for comparing the corrected differential phase signal with reference values which are multiples of the value of the differential phase signal representative of a variation of one differential phase rotation, and for providing an output level equal to the reference value immediately below the said corrected differential phase signal, and a subtraction and indicator circuit having an excitation input terminal connected to the output of the addition circuit and a subtractive reference input terminal connected to the comparator circuit to receive the said output level, thereby permitting permanent display of correct ambiguity-removal information.

Preferably, the subtraction and indicator circuit includes an analogue indicator whose nominal full-scale display signal is equal to the value of the said differential phase signal representative of a variation of one differential phase cycle.

This permits the permanent display on the indicator of correct ambiguity-removal information.

In a preferred embodiment, the device comprises a phasemeter-adder circuit for supplying phase information (channel fraction) and a number of phase rotations (channel number) from phase information obtained at the fundamental frequency of the basic network. The correction computing circuit utilises the channel number information for obtaining the correction with the desired precision. Correction computation is effected according to the linear correction formula, the correction being proportional to the difference between the fundamental channel number of the phasemeter-adder circuit and the median channel number.

In the remainder of the present description, the term phase measurement or phase difference measurement will be applied to phase measurements associated with the frequencies actually propagated. The term differential phase measurement will be applied, as above, to phase measurements associated with the beats between received signals having the said propagation frequencies, that is to say associated with ambiguity-removal frequencies. The term differential phase will also be applied to each phase thus measured, which is associated with a differential frequency or ambiguity-removal frequency.

BRIEF DESCRIPTION OF THE DRAWINGS

The invention will now be described in more detail, by way of example, with reference to the accompanying drawings, in which.

DESCRIPTION OF THE PREFERRED EMBODIMENT

Figure 1:
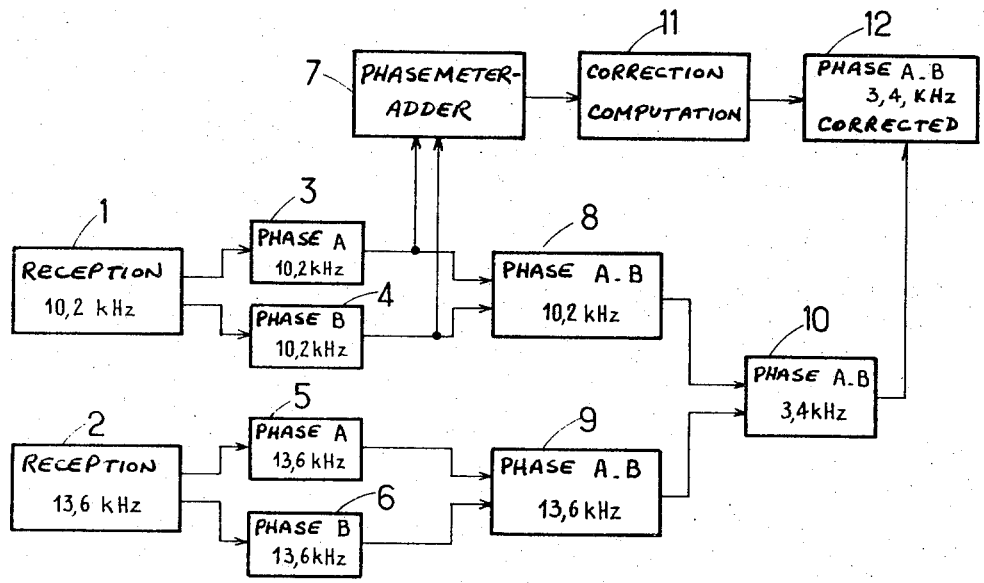
FIG. 1 illustrates the basic electrical circuit diagram of a device embodying the invention applied to the OMEGA system.

Before describing in detail an embodiment of the invention, adapted to the OMEGA radionagivation system, the constitution of the OMEGA system will first of all be summarized.

According to this system, the basic frequency, used directly for measurements of phase difference defining the narrowest channels, is equal to 10.2 kHz. For removing ambiguity there are also radiated the frequencies of 11.33 and 13.6 kHz, whose differences relative to the basic frequency are respectively 1.13 and 3.4 kHz.

It will be clear at once that the beat frequencies 1.13 and 3.4 kHz supply hyperbolic channels respectively nine times and three times wider than the 10.2 kHz channels.

The three aforesaid frequencies, i.e. 10.2, 11.33 and 13.6 kHz are all transmitted sequentially by each transmitting station with fixed phase relation, such that the channel limits obtained on the differential frequencies 3.4 and 1.13 kHz under theoretical propagation conditions coincide with theoretical channel limits in the 10.2 kHz basic network.

The OMEGA system comprises eight transmitting stations denoted respectively by letters A to H. Conventionally the hyperbolic channels of the fundamental 10.2 kHz network are numbered, the channel numbers being in increasing order when they are taken between two transmitting stations of which the second has a letter reference following that of the first in alphabetical order, for example from A TO B or from B to C.

Since the phase velocity is higher, the higher is the propagation velocity, and since the lowest frequency, i.e. 10.2 kHz is used for defining the fundamental hyperbolic network of the OMEGA system, it is necessary to apply to the differential phase measurements negative corrections for the channels of number higher than that of the middle channel, e.g. 900 and, conversely, positive corrections for the channels of number lower than 900.

In accordance with the structure of the OMEGA system, the channel numbers vary between 300 and 1,500 in the fundamental network.

The following detailed description is confined to ambiguity removal obtained at the differential frequency of 3.4 kHz, that is to say, by a differential phase measurement starting from phase-difference measurements obtained at 10.2 kHz and 13.6 kHz, respectively.

The corrections are zero for the middle channel having the number 900 because the transit times are the same for signals issuing from the two relevant stations.

The Applicants have determined experimentally a linear correction formula applicable for the 3.4 kHz hyperbolic network, which is expressed as follows:

$$C = (900 - N) \cdot K,$$

C being the correction expressed in hundredths of a phase rotation for the 3.4 kHz network, N being the channel number in the 10.2 kHz fundamental network, and K being a factor representing the phase velocity difference between the frequencies 13.6 kHz and 10.2 kHz. The experimentally determined value of the factor K is approximately 0.36 for the 3.4 kHz differential phases.

The basic circuit of the device embodying the invention will now be described on the assumption that the relevant OMEGA system stations have the letter references A and B, respectively.

FIG. 1 shows at 1 the reception stage for the waves having the frequency of 10.2 kHz. At 2 is shown the reception stage for the waves having the frequency of 13.6 kHz. In the case of the OMEGA system, and of sequential systems in general, each reception stage supplies successively, according to a known time distribution, the waves coming from each transmitting station.

In a manner known per se, the signals representative of the phase on the reception of each wave employed, are separated in accordance with the said time distribution.

Circuit 3 therefore supplies the signal representative of the phase transmitted by the transmitting station A at the frequency 10.2 kHz, which has been illustrated briefly by the reference "phase A 10.2 kHz" in FIG. 1. Similarly, circuit 4 supplies signals representative of the phase of the wave transmitted by the station B at the frequency 10.2 kHz (phase B 10.2 kHz).

Circuit 5 supplies signals representative of the phase of the wave transmitted by station A, and having the frequency 13.6 kHz (phase A 13.6 kHz), and circuit 6 supplies signals representative of the phase of the wave transmitted by the station B and having the frequency 13.6 kHz (phase B 13.6 kHz).

The phases supplied by circuits 3 and 4, for waves at the frequency 10.2 kHz, employed for defining the fundamental network, are compared in the phasemeter-adder circuit 7, adapted to measure, in number of phase rotations and possibly fractions of a phase rotation, the phase difference between waves at the frequency 10.2 kHz from stations A and B. In other words, the phasemeter-adder circuit 7 supplies and preferably displays at least the channel number in the fundamental network. It will be assumed that the operation consisting of initially displaying a number of phase rotations, that is to say, a channel number estimated in the phasemeter-adder circuit, has already been effected in any known manner. For this purpose, it is sufficient to know the geographical position of the receiver at any given instant and with adequate precision.

After an initial channel number has been displayed, the phasemeter-adder 7 is adapted to modify this channel number whenever the phase difference between the waves at the frequency 10.2 kHz from stations A and B varies algebraically by one phase rotation. Although this is not indispensable, it is advantageous if the phasemeter 7 measures and displays fractions of a phase rotation of the phase difference between these waves.

It should be noted that according to the principle of the OMEGA system, the phase information obtained from the waves arriving from the different transmitting stations is not supplied at the same instant. Circuits 3 to 6 are assumed to be provided with a storage function for a certain time, an interpolation function or any other function permitting the permanent availability of phase information.

Circuits 8 and 9 effect measurement of phase difference between the waves arriving from the stations A and B, for the frequencies 10.2 kHz and 13.6 kHz respectively. They therefore supply information Phase A-B 10.2 kHz and Phase A-B 13.6 khz, respectively.

Circuit 10 supplies an analogue signal proportional to the differential phase corresponding to the frequency of 3.4 kHz, and to stations A and B, which therefore expresses Phase A-B 3.4 kHz.

Calculation of the correction to be made in the differential phase signals supplied by circuit 10 is performed in circuit 11, on the basis of the information supplied by the phasemeter-adder 7. In view of the fact that this information supplied by phasemeter-adder 7 is not corrected, the value of the information thus supplied is not quite exact. Nevertheless, even if an error of a channel has been made or exists in the channel number of the phasemeter-adder circuit 7, the modification which results therefrom on the correction to be made is 0.3 hundredths of a channel or phase rotation. The result of the correction calculation performed from electrical information supplied by the phasemeter-adder circuit 7 is therefore valid.

Figure 2:
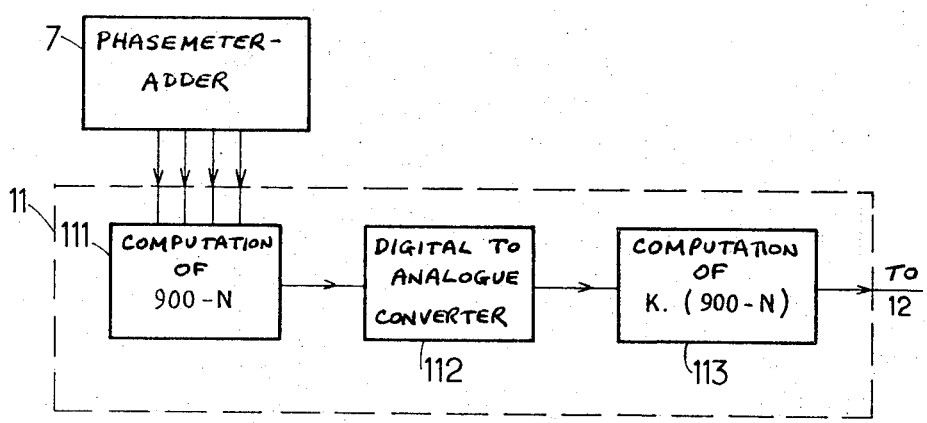
FIG. 2 illustrates in more detail the correction computing circuit 11 of FIG. 1, associated with the phasemeter-adder 7.
Figure 3:
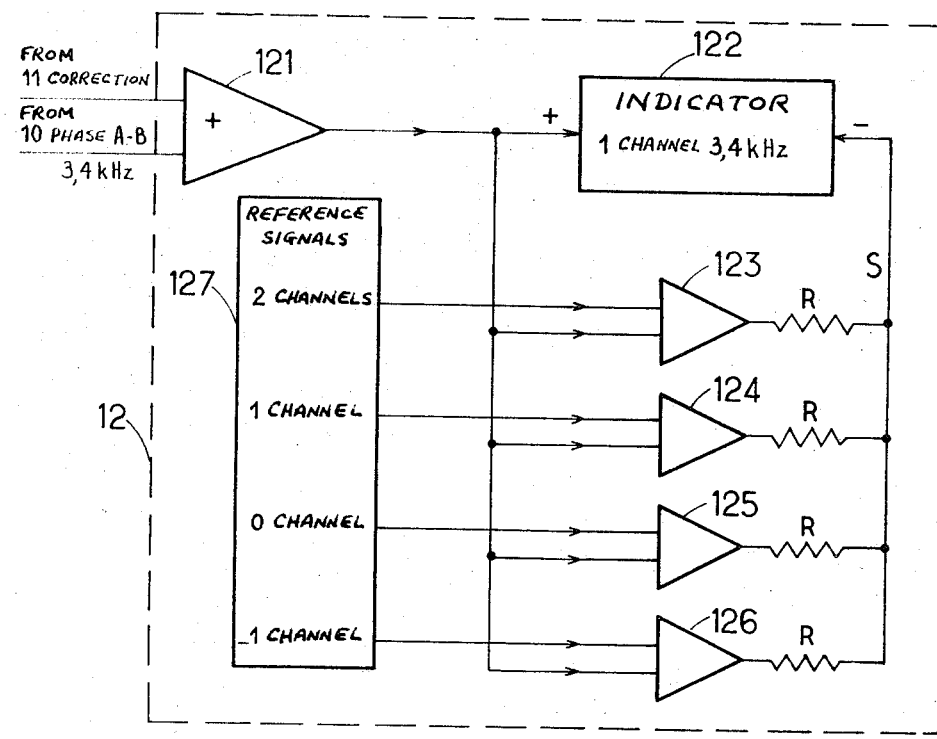
FIG. 3 illustrates the detailed electrical circuit diagram of the circuit automatically supplying ambiguity removal from corrected phase information associated with the ambiguity-removal frequencies.

The correction calculation is performed in the manner described below with reference to FIG. 2. The application of the correction to the differential phase value supplied by circuit 10 is carried out in circuit 12 of FIG. 1, in a manner to be described hereinafter with reference to FIGS. 3 and 4.

FIG. 2 again shows the phasemeter-adder 7. In a preferred embodiment, this phasemeter-adder 7 supplies in the form of digital signals information representative of the channel number, and where applicable of the channel fraction, measured by it.

This information is supplied to the correction circuit 11, which comprises a digital subtracter for performing the calculation of the term 900-N with sufficient precision. The digital information, for example in binary decimal code, representing the magnitude 900-N supplied by the circuit 111, is transmitted to a multiplier circuit 113 for working out the magnitude of the final correction, transmission being preferably made by means of a digital-to-analogue converter 112, which may be relatively simple, since three decimal figures only are normally used, if the channel fraction is disregarded.

The multiplier circuit 113 is then an analogue multiplier containing a preset signal representing the value of the coefficient K for the differential frequency concerned, and it supplies at its output an analogue signal proportional to the correction C to be made, which is expressed according to the formula given above. Of course, it is necessary that the coefficient of proportionality of this signal should be the same as that of the differential phase analogue information on which the correction is made.

The uncorrected phase signals A-B corresponding to the differential frequency 3.4 kHz are supplied by the circuit 10 to an algebraic analogue adder 121 (FIG. 3), which also receives from circuit 11 the associated correction signals. The output of circuit 121 is applied to a subtraction and display circuit 122.

The subtractive input terminal of circuit 122 receives a reference signal which is supplied by a plurality of comparators 123 to 126, whose outputs are all connected electrically by means of resistances R of equal values for supplying a current summation. The reference or compensation signal supplied to the subtractive terminal is denoted by the letter S.

Figure 4:
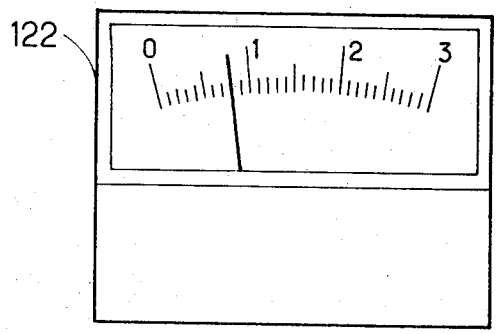
FIG. 4 is a front view of an indicator device of FIG. 3.

It is particularly advantageous for the subtraction and display circuit 122 to be an indicator, for example of the galvanometer pointer type, whose nominal fullscale display signal is equal to the value of the excitation signal representing a variation of a differential phase rotation at 3.4 kHz. The mode of display of such an indicator 122 is illustrated in FIG. 4 for a 3.4 kHz ambiguity-removal channel, that is to say three channels of the fundamental network.

A circuit 127 supplies to the comparators 123 to 126 four comparison reference signals whose amplitude is respectively equal to the said full scale nominal signal, to twice this nominal signal, to zero, and to the opposite of this nominal signal.

The comparators each receive the signal applied to the input of the indicator circuit, and respective reference signals corresponding to two 3.4 kHz channels, one channel, zero and the opposite of a channel. By way of example, it will be assumed that a variation of one 3.4 kHz differential phase rotation corresponds to a variation of 5 volts of the signal representing this differential phase. The reference signals of the comparators are therefore +10 volts, +5 volts, 0 volt, and −5 volts.

The comparators 123 to 126 are, for example, of the type supplying a saturation level of one or the other polarity according to whether the voltage to be compared is higher or lower than the reference voltage. The comparators being four in number, their saturation level is selected to be equal to 10 volts in absolute value.

The signal applied to the reference terminal of the indicator 122 therefore varies by steps as a function of the Phase A-B 3.4 kHz as shown in the following table:

TABLE

| Phase A-B 3.4 kHz | | Comparator Outputs | | | | Signal S | |
|---|---|---|---|---|---|---|---|
| Channel | Voltage | 123 Ref. +10 V | 124 Ref. +5 V | 125 Ref. 0 V | 126 Ref. −5 V | Voltage | Channel |
| +3 | +15 V | +10 | +10 | +10 | +10 | +10 | +2 |
| +2 | +10 V | −10 | +10 | +10 | +10 | +5 | +1 |
| +1 | +5 V | −10 | −10 | +10 | +10 | 0 | 0 |
| 0 | 0 | −10 | −10 | −10 | +10 | −5 | −1 |
| −1 | −5 V | −10 | −10 | −10 | −10 | −10 | −2 |
| −2 | −10 V | | | | | | |

The resistances R are selected such that their equivalent impedance is low compared with the internal impedance of the indicator 122.

The amplitude of the correction signal is at the most equal to ± 2 channels at 3.4 kHz when the channel number at 10.2 kHz varies from 300 to 1,500, so that the display of the signal of Phase A-B 3.4 kHz is always obtained in the useful part of the dial of indicator 122 (FIG. 4), which comprises 1 channel at 3.4 kHz, therefore 3 channels at 10.2 kHz. Preferably, each channel at 10.2 kHz comprises six subdivisions, as shown in FIG. 4.

The electronic device illustrated, therefore, automatically carries out the correlation supplying to the indicator correct information of the channel at 3.4 kHz, directly comparable with the channels at 10.2 kHz.

The device is used to provide:

1. Display on the phasemeter-adder 7 of the position estimated to ± 1 channel of the fundamental 10.2 kHz network, for example channel 742;
2. Correction of the phase of the fundamental network (using the correction tables); if the fraction of phase rotation of the fundamental network is 0.35 and if the correction to be made to this value according to the table is +0.30, the corrected partial phase of the 10.2 kHz network is therefore 0.65, and according to the estimate, the complete information in the 10.2 kHz network is 742.65.

The device supplies an ambiguity-removal indication in a channel three times larger, which should correspond to the above-mentioned indication, with a certain precision depending on the geographical conditions and the precision of the device itself. Agreement of the readings (phase 10.2 kHz corrected and phase 3.4 kHz) should be within a range equal to ± 0.30 of a 10.2 kHz channel in all cases.

Furthermore, depending on the sector of the indicator 122 in which the pointer is situated, the remainder of the division by three of the 10.2 kHz channel number is known; this remainder is 0, 1 or 2, respectively, according to whether the pointer is in sector 0 − 1, sector 1 − 2 or sector 2 − 3.

Continuing the above example, suppose the indicator 122 shows for example 2.80. The fundamental value 0.80 is well within a range of ± 0.30 around the value 0.65 obtained in the fundamental network.

However, the remainder of the division by three of the fundamental channel number ought to be 2 according to the ambiguity-removal device, while the well-known criterion of divisibility by 3 applied to the estimate 742 provides a remainder of 1. The estimate is therefore wrong, the correct value being either 740 or 743; the value 743 is retained, being closer to the estimate, and the final result in the fundamental network is 743.65.

To facilitate this correction as a function of the remainder of the division by three, a modification of the device consists in detecting this remainder either from the channel number of the phasemeter-adder 7 (excluding channel fractions) or from the output signal from the digital subtracter 11 (the number of digits being smaller there) by means of the criterion of divisibility by three, and comparing the voltage at the terminals of the indicator 122 at one-third and at two-thirds of the full scale of the said indicator. It is then easy to control the lighting of lamps indicating the modification to be made in the channel number (± 1 unit) or again to control this modification directly in the phasemeter-adder 7.

The initial determination of the channel number having been done, the phasemeter 7 then adds the channels and retains the true value permanently. The indicator 122 automatically indicates corrected ambiguity-removal information.

An ambiguity-removal device for the 1.13 kHz network comprises the same components and above all the same phasemeter-adder 7 as for the 3.4 kHz network. Nevertheless, the coefficient K of the correction is about three times less, e.g. about 0.13, and the indicator 122 then comprises 3 principal divisions corresponding to the 3.4 kHz network, each comprising 3 subdivisions for the 10.2 kHz network, and possibly a graduation in each subdivision. Of course, the number of comparators used is less.

The device used for the 3.4 kHz and/or 1.13 kHz differential phases has the following advantages for the operator:

i. elimination of manual correction of differential phases, ii. permanent and instantaneous verification of the value of the channel in the fundamental network, iii. possibility of direct reading of the phases in the fundamental network before making the corrections.

The operator has therefore only to verify the exactitude of the fundamental channel member, then correct the phase of the fundamental network and verify the agreement of the phase thus corrected with that of the indicators, taking the above-mentioned precision into account.

A radionavigation receiver normally comprises at least as many devices of the type described as there are pieces of position-line information processed.

We claim:

1. In a phase-measurement radionavigation receiver supplying a differential phase signal intended, after correction, for ambiguity removal and a correction signal for said differential phase signal, an electronic ambiguity-removal device comprising:

adding means for algebraically adding said differential phase signal and said correction signal to supply a corrected differential phase signal;

a comparator circuit coupled to said adding means to compare said corrected differential phase signal with reference values, said reference values being multiples of the value of said differential phase signal representative of a variation of one differential phase rotation, and to provide an output level equal to the one of said reference values which lies immediately below said corrected differential phase signal; and a subtraction and indicator circuit having a signal input terminal coupled to said adding means to receive said corrected differential phase signal and a subtractive reference input terminal coupled to said comparator circuit to receive said output level, thereby permanently indicating correct ambiguity-removal information.

2. The combination claimed in claim 1, wherein said subtraction and indicator circuit comprises an indicator whose nominal full-scale display signal is equal to said value of said differential phase signal representative of a variation of one differential phase rotation.

3. The combination claimed in claim 2, wherein said comparator circuit comprises means for producing reference voltages representing said reference values, respectively, and a plurality of comparator elements each receiving one of the reference voltages, each of said comparator elements being adapted to supply a saturation level of a polarity in accordance with whether the voltage to be compared and applied to it is higher or lower than the reference voltage which it receives, and the output of each comparator being connected by a resistor to said reference terminal of said subtraction and indicator circuit, all such resistors having the same resistance value.

4. In a phase measurement radionavigation receiver of the hyperbolic type supplying a differential phase signal intended, after correction, for ambiguity removal, an electronic ambiguity removal device comprising:

a phasemeter adapted to supply an integral number of phase rotations representing a channel number information referred to a middle channel number in an hyperbolic network, a subtracter circuit for subtracting said middle channel number from the channel number given by said phasemeter, a multiplier circuit for multiplying the number obtained after subtraction by a factor dependent on the speeds of propagation of the waves used for obtaining the differential phase signal, to supply a correction signal;

adding means for algebraically adding said differential phase signal and said correction signal to supply a corrected differential phase signal;

a comparator circuit coupled to said adding means to compare said corrected differential phase signal with reference values, said reference values being multiples of the value of said differential phase signal representative of a variation of one differential phase rotation, and to provide an output level equal to the one of said reference values which lies immediately below said corrected differential phase signal; and a subtraction and indicator circuit having a signal input terminal coupled to said adding means to receive said corrected differential phase signal and a subtractive reference input terminal coupled to said comparator circuit to receive said output level, thereby permanently indicating correct ambiguity-removal information.

5. The combination claimed in claim 4, in which said differential phase signal is the 3.4 kHz signal of the OMEGA system, said factor is about 0.36, and said indicator comprises three sectors corresponding to the three channels of the basic network contained in a single 3.4 kHz channel.

6. The combination claimed in claim 5, wherein said comparator circuit comprises four comparator elements with respective reference voltages equal to +2 times, +1 times, zero, and −1 times the value of said 3.4 kHz differential phase signal representing a variation of one phase rotation.

7. The combination claimed in claim 4, in which said differential phase signal is the 1.13 kHz signal of OMEGA system, said factor is about 0.13, and said indicator comprises nine sectors corresponding to the nine channels of the basic network which are contained in a single 1.13 kHz channel.

8. The combination claimed in claim 4, using a second differential phase signal associated with wider channels, and including:

a second multiplier circuit for multiplying said number obtained after subtraction by another factor dependent on the speeds of propagation of the waves used for obtaining the differential phase signal, to supply a second correction signal;

a second adding means for algebraically adding said second differential phase signal with the second correction signal;

a second indicator having a signal terminal coupled to the output of said second adding means and a reference terminal, and having a second full-scale nominal signal; and a comparator circuit for said second differential phase signal corrected to second reference values which are multiples of said second nominal signal, for applying to said reference terminal a compensation output level equal to the second reference value immediately below said second corrected differential signal.

9. The combination claimed in claim 8, in which said second differential phase signal is related to the 1.13 kHz differential frequency of the OMEGA system, said second correction computing circuit comprises a second multiplier circuit for the channel number obtained after subtraction by a factor about 0.13, and said second indicator comprises nine sectors corresponding to the nine channels of the basic network contained in a single 1.13 kHz channel.

* * * * *